United States Patent
Peng

(10) Patent No.: US 10,259,946 B1
(45) Date of Patent: Apr. 16, 2019

(54) SEALING AGENTS, METHODS OF MAKING AND USES THEREOF

(71) Applicant: JAMES HARDIE TECHNOLOGY LIMITED, Dublin (IE)

(72) Inventor: Weiling Peng, Rancho Cucamonga, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 15/470,646

(22) Filed: Mar. 27, 2017

Related U.S. Application Data

(60) Provisional application No. 62/313,546, filed on Mar. 25, 2016.

(51) Int. Cl.
  *C08K 3/32* (2006.01)
  *C09D 1/06* (2006.01)
  *C23F 11/08* (2006.01)
  *C04B 28/34* (2006.01)
  *C04B 111/00* (2006.01)

(52) U.S. Cl.
  CPC ............... *C09D 1/06* (2013.01); *C04B 28/34* (2013.01); *C08K 3/32* (2013.01); *C23F 11/08* (2013.01); *C04B 2111/00525* (2013.01)

(58) Field of Classification Search
  CPC .. C09D 1/06; C08K 3/32; C04B 28/34; C04B 2111/00525; C23F 11/08
  See application file for complete search history.

(56) References Cited

U.S. PATENT DOCUMENTS 6,402,990 B1 * 6/2002 Marazzani ............ C04B 41/009
    106/14.05
6,712,995 B2 * 3/2004 Marazzani ............ C04B 41/009
    106/14.12

* cited by examiner

*Primary Examiner* — Anthony J Green
(74) *Attorney, Agent, or Firm* — Knobbe, Martens, Olson & Bear, LLP

(57) ABSTRACT

Embodiments of the present disclosure relate generally to coating compositions which are suitable for use as sealing agents, methods of making and uses thereof. The disclosed coating compositions may be particularly suitable for application as a sealing agent to a burnished surface of a cementitious substrate, such as the cut face of a fiber cement board.

7 Claims, 1 Drawing Sheet

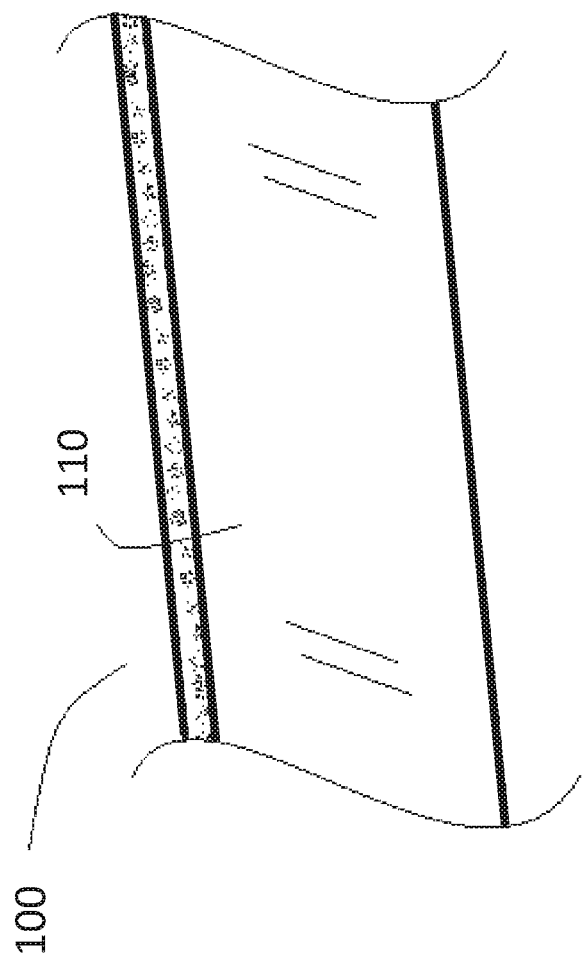

SEALING AGENTS, METHODS OF MAKING AND USES THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the present invention relate generally to coating compositions for composite building materials, methods of making, and uses thereof. The disclosed coating compositions may be particularly suitable for use as a sealing agent for composite building materials with cementitious substrates.

Description of the Related Art

The surfaces of composite building materials are often modified to enhance their suitability for a particular use or function, for example, cutting the building material to reduce its size, sanding to alter the shape of the material and so forth. In many instances, friction from the cutting tools or other instruments used to modify the building material leaves the surface burnished.

Due to the different surface characteristics, it is often more difficult to apply coatings such as sealing agents to burnished surfaces than non-burnished surfaces. For example, uniform coating coverage and adhesion to the cut face of a fiber cement substrate is sometimes difficult to achieve.

SUMMARY

Disclosed herein are various embodiments of a coating composition that is suitable for use as a sealing agent for fiber cement and other composite building materials. The coating composition can be applied to a burnished surface of a cementitious substrate, such as the cut face of a fiber cement siding board.

In some embodiments, the coating composition comprises water; an alkali metal dihydrogen phosphate; and a water soluble dye composition. In one embodiment, the coating composition comprises about 5 to 40% by weight (% wt.) of an alkali metal dihydrogen phosphate and an amount of water soluble dye composition that is based on the % wt. of the alkali metal dihydrogen phosphate. In one implementation, the ratio of the % wt. of the water soluble dye composition relative to the alkali metal dihydrogen phosphate is between 0.01 and 1. The alkali metal dihydrogen phosphate dissolves in the water thereby forming an acidic aqueous solution comprising dihydrogen phosphate and alkali metal ions. The water soluble dye composition is acid-stable and can disperse homogeneously in the acidic aqueous solution without lumping. In certain embodiments, the coating composition provides sufficient hydrogen ions to neutralize one or more functional groups on the surface of a cementitious substrate. In one implementation, the pH value of the coating composition is maintained between 3 and 5, or at around 4.5. In further embodiments, the water soluble dye composition comprises water and about 1 to 50 mg/mL of disodium 6-hydroxy-5-[(2-methoxy-5-methyl-4-sulfophenyl)azo] 2-naphthalene sulfonate and 2-(6-hydroxy-2,4,5,7-tetraiodo-3-oxo-xanthen-9-yl)benzoic acid, optionally one or more additives, and optionally a preservative.

In some embodiments, a water-borne sealing agent for cementitious substrates is provided, comprising dihydrogen phosphate and alkali metal ions in an amount sufficient to maintain the pH of the sealing agent in a range compatible with the surface condition of the cementitious substrate so as to facilitate uniformly coating of the surface. The water-borne sealing agent further comprises a water-based dye composition that is stable in an acidic environment and disperses throughout the water-borne sealing agent to provide a tint to the cementitious substrate. In one embodiment, the water-borne sealing agent comprises 5-40% wt. of dihydrogen phosphate and alkali metal ions. In one implementation, the alkali metal ions are sodium ions. In another embodiment, the weight ratio of the water-based dye composition to the dihydrogen phosphate and alkali metal ions is about 0.01 to 0.5. In certain embodiments, the pH of the water-borne sealing agent is maintained at about 3 to 5, or about 4.5, so as to provide sufficient hydrogen ions to neutralize one or more functional groups on the surface of the cementitious substrate. In another embodiment, the water-based dye composition comprises water and one or more dye molecules dispersed therein, the dye molecules comprising disodium 6-hydroxy-5-[(2-methoxy-5-methyl-4-sulfophenyl)azo] 2-naphthalene sulfonate, and 2-(6-hydroxy-2,4,5,7-tetraiodo-3-oxo-xanthen-9-yl)benzoic acid. In another embodiment, the dye composition comprises water, disodium 6-hydroxy-5-[(2-methoxy-5-methyl-4-sulfophenyl)azo] 2-naphthalene sulfonate, 2-(6-hydroxy-2,4,5,7-tetraiodo-3-oxo-xanthen-9-yl)benzoic acid, propylene glycol, and paraben. In yet another embodiment, the one or more dye molecules are about 1 to about 50 mg/mL of the water-based dye composition.

Also disclosed herein are various embodiments of a composite building material coated with a water-borne sealant composition that is formulated to facilitate uniform application of the sealant to burnished surfaces of the composite building material, such as a cut face of a fiber cement panel. In some embodiments, a coated composite building material comprising a substrate having a coating layer applied to at least a portion of the substrate, such as a cut face of the substrate, is provided, wherein the at least one coating layer includes a water-borne sealing agent comprising an aqueous solution of dihydrogen phosphate and an alkali metal ion, wherein the solid content of the aqueous solution is about 5-40% wt. The sealing agent further includes a dye composition comprising water, one or more dye molecules that can disperse in a low pH environment, and optionally one or more additives, present in a weight ratio of about 0.01 to about 1 relative to the % wt. of the solid content of the aqueous solution. The dye composition provides a tint to the sealing agent such that an end user may visually determine that the sealing agent has been applied uniformly to the substrate of the building material. In one implementation, the composite building material comprises a coated surface having a dE of about 2 to about 30 relative to a corresponding uncoated composite building material. In another implementation, the coating layer comprising the sealing agent has a coating weight of about 2 to 40 g/ft$^2$, or 3 and 35 g/ft$^2$, or 4 and 30 g/ft$^2$, or 5 and 25 g/ft$^2$, or 10 and 25 g/ft$^2$. In another implementation, the coating layer is at least partially cured. In another implementation, the composite building material further comprises at least one top coat layer applied to the coating layer. In another implementation, the top coat layer is at least partially cured. In another implementation, the substrate of the coated composite building material can comprise cement, gypsum, wood, and/or other suitable building materials such as those containing cellulose, glass, steel or polymeric fibers; and the composite building material can be a siding, decking, fascia, fence post, or the like. In another implementation, the one or more dye molecules comprises disodium 6-hydroxy-5-[(2-methoxy-5-methyl-4-sulfophenyl)azo] 2-naphthalene sulfonate, and 2-(6-hydroxy-2,4,5,7-tetraiodo-3-oxo-xanthen-9-yl)benzoic acid. In another implementation, the dye composition comprises water, disodium 6-hydroxy-5-[(2-methoxy-5-methyl-4-sulfophenyl)azo] 2-naphthalene sulfonate, 2-(6-hydroxy-2,4,5,7-tetraiodo-3-oxo-xanthen-9-yl) benzoic acid, propylene glycol, and paraben.

Also disclosed herein are various embodiments of a method for applying a uniform coating to a composite building material. The method comprises applying a waterborne sealant composition to a burnished surface of the composite building material, wherein the sealant composition is formulated to facilitate uniform application of the sealant to burnished surfaces of the composite material. In some embodiments, the method comprises the steps of providing a composite substrate, coating at least a portion of the composite substrate with at least one coating layer to produce a coated surface, wherein the at least one coating layer comprises a sealing agent. The sealing agent comprises water; about 5 to 40% wt. alkali metal dihydrogen phosphate; and a water based dye composition, wherein the dye composition weight ratio is between 0.01 and 1 relative to the % wt. of the alkali metal dihydrogen phosphate, and at least partially curing the coating layer. In an implementation, the dye composition comprises disodium 6-hydroxy-5-[(2-methoxy-5-methyl-4-sulfophenyl)azo] 2-naphthalene sulfonate, and 2-(6-hydroxy-2,4,5,7-tetraiodo-3-oxo-xanthen-9-yl)benzoic acid. In another implementation, the dye composition comprises water, disodium 6-hydroxy-5-[(2-methoxy-5-methyl-4-sulfophenyl)azo] 2-naphthalene sulfonate, 2-(6-hydroxy-2,4,5,7-tetraiodo-3-oxo-xanthen-9-yl) benzoic acid, propylene glycol, and paraben.

Also disclosed herein are various embodiments of a method for preparing a sealant agent for composite building materials. In some embodiments, the method comprises adding a dye composition to an acidic aqueous solution comprising dihydrogen phosphate and alkali metal ions. The concentration of the aqueous solution is selected to maintain the pH of the sealant agent at about 3 to 5; and the dye composition is water-based and capable of dispersing in the pH environment of the aqueous solution without lumping. In one embodiment, the amount of dye composition is selected to provide a dE of about 2 to about 30 upon application of the composition to a composite substrate. In some implementations, the acidic aqueous solution comprises dihydrogen phosphate and sodium ions; and the dye composition comprises one or more water soluble dye molecules comprising disodium 6-hydroxy-5-[(2-methoxy-5-methyl-4-sulfophenyl)azo] 2-naphthalene sulfonate and 2-(6-hydroxy-2,4,5,7-tetraiodo-3-oxo-xanthen-9-yl)benzoic acid.

BRIEF DESCRIPTION OF THE DRAWINGS

The FIGURE shows an example of a composite substrate having a layer of coating applied thereto in accordance to certain embodiments of the present disclosure.

DETAILED DESCRIPTION

Described herein are coating compositions suitable for uniform application as a sealing agent on composite building materials, particularly on burnished surfaces such as a cut face of a cementitious substrate. The coating compositions are compatible with the surface condition of the cementitious substrate and may react with one or more functional groups on the surface to facilitate uniform coverage. The coating compositions also provide an indicator that allows users to easily visualize the extent and uniformity of sealing agent coverage across the substrate.

In some embodiments, the composition is a waterborne sealing agent comprising an aqueous solution of an alkali metal dihydrogen phosphate with a pH selected to prime and seal the surface of a cementitious substrate; an acid-stable and water-soluble dye; and optionally other additives. In some embodiments, the composition includes about 5 to 40% wt. of an alkali metal dihydrogen phosphate, a water-based dye composition that is acid-stable, wherein the weight ratio of the dye composition to the alkali metal dihydrogen phosphate is about 0.01 to about 0.5. In one embodiment, the pH value of the composition is about 3 to about 5 so as to provide sufficient hydrogen ions to neutralize one or more functional groups on the surface of a cementitious substrate. In further embodiments, the dye composition can comprise water, about 1 to about 50 mg/mL combined concentration of disodium 6-hydroxy-5-[(2-methoxy-5-methyl-4-sulfophenyl)azo] 2-naphthalene sulfonate and 2-(6-hydroxy-2,4,5,7-tetraiodo-3-oxo-xanthen-9-yl)benzoic acid, optionally one or more additives, and optionally a preservative. In one embodiment, the composition can comprise about 5 to about 40% wt. of sodium dihydrogen phosphate, about 0.001 to about 1% wt. of one or more dye molecules, and about 60 to about 95% wt. water. Such compositions can advantageously modify the surface of the cementitious substrate to increase adhesion of a top coat, and are particularly suited to composite building products having machined and/or burnished surfaces. Further aspects or embodiments of the present disclosure will become apparent from the ensuing description which is given by way of example only.

The alkali metal dihydrogen phosphate in the composition dissolves in the water to form an aqueous solution comprising dihydrogen phosphate and alkali metal ions. The aqueous solution comprising dihydrogen phosphate and alkali metal ions maintains the sealing agent at a low pH range selected to provide for interaction with one or more functional groups on the surface of the cementitious substrate. Without wishing to be limited by theory, it is believed that a composition provided herein may induce chemical reactions at the surface of the cementitious composite substrate, changing the polar properties at the surface. For example, it is believed that fiber cement composites generally include basic functional groups, which may be neutralized and/or modified upon treatment with the waterborne sealing agent. The functional groups can be, for example, oxygen-based functional groups, such as carboxylic and hydroxyl. Thus, the surface coated with the composition advantageously has more adherence to a top coat, compared to an untreated composite specimen. The top coat(s) can be, for example, a primer and/or an exterior grade satin paint.

The alkali metal dihydrogen phosphate is selected to maintain the pH of the sealant agent within a range on the lower end. Generally, the alkali metal dihydrogen phosphate is a water soluble solid. However, in some embodiments, the alkali metal dihydrogen phosphate may be present in the composition in a concentration at, or near, its solubility limit. In some embodiments, the alkali metal dihydrogen phosphate is selected for chemical compatibility with the other components of the composition, in particular the dye, and to provide to the composition with a pH suitable for sealing and priming of the surface of a cementitious composite substrate. In some embodiments, the pH of the resulting sealing agent is less than about 6, less than about 5.5, less than about 5, less than about 4.5, less than about 4, less than about 3.5, less than about 3, less than about 2.5, less than about 2, less than about 1.5, or less than about 1. In certain embodiments, the pH is about 3.5 to about 4.5, about 3 to about 5, about 2.5 to about 5.5, about 2 to about 6, or about 1 to about 7. In some embodiments, the pH is about 1, 1.5, 2, 2.5, 3, 3.5, 4, 4.5, 5, 5.5, 6, 6.5, or 7. In preferred embodiments, the pH of the sealing agent is about 3 to about 5, for example, about 4.5.

Generally, the alkali metal dihydrogen phosphate comprises a cation and an anion. In some embodiments, the cation is selected to provide water solubility. In some embodiments, the cation is an alkali metal ion selected from lithium, sodium, potassium, rubidium, and cesium, and may be, for example, sodium. In some embodiments, the anion of the alkali metal dihydrogen phosphate is the aqueous solution provides dissociable hydrogen ions to maintain the desired low pH. Further, because the anion may be to some extent incorporated in the surface structure of the composite article, in some embodiments, the anion is selected for compatibility therewith. In some embodiments, the anion is dihydrogen phosphate ($H_2PO_4^-$). In some embodiments, the solid content of the composition is about 5% wt. to 40% wt., or about 20% wt. to 40% wt. In further embodiments, the solid content of the composition in about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40% wt. For example, in a certain embodiment, the composition may comprise about 5 g to about 40 g sodium dihydrogen phosphate ($NaH_2PO_4$) in about 60 g to about 95 g of water, and a water soluble dye in a weight ratio as provided herein.

Advantageously, the composition includes a water soluble dye to provide the color or tint to the composition. Thus, when the composition is applied to a substrate, an end user can visually determine the extent of coverage of a substrate by the composition. This determination has two aspects: first, whether the composition has covered all of the intended surface(s); and second, whether the composition has been applied uniformly to a surface. This is particularly useful in the field, where it is important to ensure that a modified or cut surface has been correctly sealed.

In some embodiments, the dye is selected to be compatible with the low pH of the composition. Thus, advantageously the dye retains its color, is chemically stable, and does not itself adversely affect the overall low pH range of the composition (which is to say, in some embodiments, the dye does not significantly alter the pH of the composition). Further, in some embodiments, the dye is selected to impart to the composition a color that is easily visible upon application to a composite substrate. Thus, in some embodiments, the dye is a green dye or a red dye at the pH of the composition.

In some embodiments, the dye consistently imparts color to a composite substrate upon application thereto. Advantageously, the dye can remain homogeneously dispersed under low pH conditions. It was found that particulate dyes were not suitable, for instance, due to their coagulation and/or flocculation in the composition. Inhomogeneity in the composition may result in unevenness of coverage during use in the field. Thus, in some embodiments, the dye is water soluble, because such dyes permit compositions to be homogeneous on a molecular level. The compositions provided herein advantageously do not require additional steps of mixing or agitating prior to application, and are usable off the shelf following storage. A dye as provided herein advantageously provides a user-friendly sealing agent for application in the field. In some embodiments, one or more dye molecules can be present in the composition suitable for use as a sealing agent in about 0.001 to about 1% wt., or preferably about 0.01 to about 0.5% wt.

In one embodiment, the water soluble dye, or one or more dye molecules, is selected from the group consisting of an azo, diazo, triphenylmethane, anthraquinone, methine, xanthine, oxazine, thiazine, azine, thiazole, quinolinone, aminoketone, nitro, nitroso, phthalocyanine, acridine, indamine, indophenol, or fluorescein dye. In further embodiments, the dye can be selected from dye molecules provided herein. In some embodiments, the one or more dye molecules can be selected from hydroxyethyl-2-nitro-p-toluidine; 2-hydroxyethylpicramic acid; 4-nitrophenylaminourea; tri(4-amino-3-methylphenyl)carbenium chloride; 1,4-diamino-9,10-anthracenedione; 1,4-bis[(2-hydroxyethyl)amino]-2-nitrobenzene; 1-(2-hydroxyethyl)amino-2-nitro-4-[di(2-hydroxyethyl)amino]benzene; 1-amino-3-methyl-4-[(2-hydroxyethyl)amino]-6-nitrobenzene; 4-[ethyl-(2-hydroxyethyl)amino]-1-[(2-hydroxyethyl)amino]-2-nitrobenzene hydrochloride; 4-[di(2-hydroxyethyl)amino]-1-[(2-methoxyethyl)amino]-2-nitrobenzene; 1-[(2,3-di hydroxypropyl)amino]-4-[methyl-(2-hydroxyethyl)amino]-2-nitrobenzene; 1-[(2,3-dihydroxypropyl)amino]-4-[ethyl-(2-hydroxyethyl)amino]-2-nitrobenzene hydrochloride; 1-(3-hydroxypropylamino)-4-[di(2-hydroxyethyl)amino]-2-nitrobenzene; 1-methylamino-4-[methyl-(2,3-dihydroxypropyl)amino]-2-nitrobenzene; 2-[(4-amino-2-nitrophenyl)amino]-5-dimethylaminobenzoic acid; 1-amino-4-[(2-hydroxyethyl)amino]-2-nitrobenzene; 2-amino-4,6-dinitrophenol; 4-amino-2-nitrodiphenylamine; 1-amino-4-[di(2-hydroxyethyl)amino]-2-nitrobenzene hydrochloride; 1-amino-5-chloro-4-[(2-hydroxyethyl)amino]-2-nitrobenzene; 4-amino-1-[(2-hydroxyethyl)amino]-2-nitrobenzene; 4-amino-3-nitrophenol; 4-[(2-hydroxyethyl)amino]-3-nitrophenol; 1-[(2-aminoethyl)amino]-4-(2-hydroxyethoxy)-2-nitrobenzene; 4-(2,3-dihydroxypropoxy)-1-[(2-hydroxyethyl)amino]-2-nitrobenzene; 1-amino-5-chloro-4-[(2,3-dihydroxypropyl)amino]-2-nitrobenzene; 5-chloro-1,4-[di(2,3-di hydroxypropyl)amino]-2-nitrobenzene; 2-[(2-hydroxyethyl)amino]-4,6-dinitrophenol; 4-ethylamino-3-nitrobenzoic acid; 2-[(4-amino-2-nitrophenyl)amino] benzoic acid; 2-chloro-6-ethylamino-4-nitrophenol; 2-amino-6-chloro-4-nitrophenol; 4-[(3-hydroxypropyl) amino]-3-nitrophenol; 2,5-diamino-6-nitropyridine; 1,2,3,4-tetrahydro-6-nitroquinoxaline; 7-amino-3,4-dihydro-6-nitro-2H-1,4-benzoxazine; 1-amino-2-[(2-hydroxyethyl) amino]-5-nitrobenzene; 1-(2-hydroxyethoxy)-2-[(2-hydroxyethyl)amino]-5-nitrobenzene; 1-[(2-hydroxyethyl) amino]-2-nitrobenzene; 2-[(2-hydroxyethyl)amino]-1-methoxy-5-nitrobenzene; 2-amino-3-nitrophenol; 1-(2-hydroxyethoxy)-3-methylamino-4-nitrobenzene; 2,3-(dihydroxypropoxy)-3-methylamino-4-nitrobenzene; 2-[(2-hydroxyethyl)amino]-5-nitrophenol; 3-[(2-aminoethyl) amino]-1-methoxy-4-nitrobenzene hydrochloride; 1-[(2-ureidoethyl)amino]-4-nitrobenzene; 4-[(2,3-di hydroxypropyl)amino]-3-nitro-1-trifluoromethylbenzene; 1-chloro-2,4-bis[(2-hydroxyethyl)amino]-5-nitrobenzene; 4-[(2-hydroxyethyl)amino]-3-nitro-1-methylbenzene; 1-chloro-4-[(2-hydroxyethyl)amino]-3-nitrobenzene; 4-[(2-hydroxyethyl)amino]-3-nitro-1-trifluoromethylbenzene; 4-[(2-hydroxyethyl)-amino]-3-nitrobenzonitrile; 4-[(2-hydroxyethyl)amino]-3-nitrobenzamide; 1,4-di[(2,3-dihydroxypropyl)amino]-9,10-anthraquinone; 1-[(2-hydroxyethyl)amino]-4-methylamino-9,10-anthraquinone; 2-[(2-aminoethyl)amino]-9,10-anthraquinone; 1-hydroxy-4-[(4-methyl-2-sulfophenyl)-amino]-9,10-anthraquinone; 1-[(3-aminopropyl)amino]-4-methylamino-9,10-anthraquinone; 1-[(3-aminopropyl)amino]-9,10-anthraquinone; 1,4-di-amino-2-methoxy-9,10-anthraquinone; 1,4-di hydroxy-5,8-bis[(2-hydroxyethyl)amino]-9,10-anthraquinone; 9-(dimethylamino)benzo[a]-phenoxazin-7-ium chloride; di[4-(diethylamino)phenyl][4-(ethylamino)naphthyl]carbenium chloride; 3,7-di(dimethylamino)phenothiazin-5-ium chloride; di[4-(dimethylamino)phenyl][4-(phenylamino)naphthyl]carbenium chloride; 2-[(4-(ethyl-(2-hydroxyethyl)amino)phenyl)azo]-6-methoxy-3-methylbenzothi-azolium methylsulfate; 8-amino-2-bromo-5-hydroxy-4-imino-6-{[(3-trimethylammonio)phenyl]amino}-1-(4H)-naphthalenone chloride; bis[4-(dimethylamino)phenyl][4-(methylamino)phenyl]carbenium chloride; tris[4-(dimethylamino)phenyl]carbenium chloride; 2-[3,6-(diethylamino)dibenzopyranium-9-yl]benzoyl chloride; di(4-aminophenyl)-(4-amino-3-methylphenyl)carbenium chloride; 1,3-bis[(2,4-diamino-5-methylphenyl)azo]-3-methylbenzene; 1-[(4-aminophenyl)azo]-7-(trimethylammonio)-2-naphthol chloride; 1-[(4-amino-2-nitro-phenyl) azo]-7-(trimethylammonio)-2-naphthol chloride; 1-[(4-amino-3-nitrophenyl)azo]-7-(trimethylammonio)-2-naphthol chloride; 3,7-diamino-2,8-dimethyl-5-phenylphenazinium chloride; 1,4-dimethyl-5-{[4-(dimethylamino)phenyl]azo}-1,2,4-triazolium chloride; 2-hydroxy-1-[(2-methoxyphenyl)azo]-7-(trimethylammonio)-naphthalene chloride; 2-{2-[(2,4-dimethoxyphenyl)amino]ethenyl}-1,3,3-trimethyl-3H-indol-1-ium chloride; 3-methyl-1-phenyl-4-{[3-(trimethylammonio)phenyl]azo}pyrazol-5-one chloride; bis[4-(diethylamino)phenyl] phenylcarbenium hydrogen sulfate; 1-[di-(2-hydroxyethyl)amino]-3-methyl-4-[(4-nitrophenyl)azo]benzene; 4-[(4-aminophenyl)azo]-1-[di-(2-hydroxyethyl)amino]-3-methylbenzene; 2,6-diamino-3-[(pyridin-3-yl)-azo] pyridine; disodium 6-hydroxy-5-[(4-sulfophenyl)azo]-2-naphthalenesulfonate; disodium 2,4-dinitro-1-naphthol-7-sulfonate; 2-(indan-1,3-dion-2-yl)-quinolin-x,x-sulfonic acid (mixture of mono- and disulfonic acid); trisodium 5-hydroxy-1-(4-sulfophenyl)-4-[(4-sulfophenyl)azo]pyrazole-3-carboxylate; 9-(2-carboxyphenyl)-6-hydroxy-3H-xanthen-3-one; sodium 5-[(2,4-dinitrophenyl)amino]-2-phenylaminobenzene-sulfonate; monosodium 4-[(2,4-dihydroxyphenyl)-azo]benzenesulfonate; sodium 4[(2-hydroxynaphth-1-yl)azo]benzenesulfonate; sodium 4-[(2,4-di hydroxy-3-[(2,4-dimethylphenyl)azo]phenyl)azo] benzenesulfonate; disodium 4-hydroxy-3-[(4-sulfonaphth-1-yl)azo]-1-naphthalenesulfonate; trisodium 6-hydroxy-5-[(4-sulfonaphth-1-yl)azo]-2,4-naphthalenedisulfonate; trisodium 3-hydroxy-4-[(4-sulfonaphth-1-yl)azo]-2,7-naphthalenedisulfonate; disodium 8-amino-1-hydroxy-2-(phenylazo)-3,6-naphthalenedisulfonate; disodium 5-(acetylamino)-4-hydroxy-3-[(2-methylphenyl)azo]-2,7-naphthalenedisulfonate; disodium 2-(3-hydroxy-2,4,5,7-tetraiododibenzopyran-6-on-9-yl)benzoate; N-[6-(diethylamino)-9-(2,4-disulfophenyl)-3H-xanthen-3-ylidene]-N-ethylethaneammonium hydroxide inner salt, sodium salt; disodium 8-{[4-(phenylazo)phenyl]azo}-7-naphthol-1,3-disulfonate; 2',4',5',7'-tetrabromo-3',6'-dihydroxyspiro{isobenzofuran-1 (3H), 9'-[9H]xanthen}-3-one disodium salt; 2',4',5',7'-tetrabromo-4,5,6,7-tetrachloro-3',6'-dihydroxyspiro-{isobenzo-furan-1-3H}; 9'[9H]xanthen} disodium salt, 3',6'-dihydroxy-4',5'-diiodospiro{isobenzofuran-1 (3H); 9(9H)-xanthen}-3-one disodium salt, 2-naphthalenesulfonic acid, 6-hydroxy-5-disodium salt; disodium 6-hydroxy-5-2-naphthalenesulfonate; (2-sulfophenyl)di[4-(ethyl((4-sulfophenyl)methyl)amino) phenyl] carbenium disodium salt; betaine; 1,4-bis[(2-sulfo-4-methylphenyl)amino]-9,10-anthraquinone disodium salt; bis[4-(dimethylamino)phenyl]-(3,7-disulfo-2-hydroxynaphth-1-yl)carbenium inner salt, monosodium salt; bis[4-(diethyl-amino)phenyl](2,4-disulfophenyl)carbenium inner salt, sodium salt (2:1); bis[4-(diethylamino)phenyl](5-hydroxy-2,4-disulfophenyl)carbenium inner salt, calcium salt (2:1); sodium 1-amino-4-(cyclohexylamino)-9,10-anthraquinone-2-sulfonate; disodium 2-(1,3-dihydro-3-keto-5-sulfo-2H-indol-2-ylidene)-2,3-dihydro-3-keto-1H-indol-5-sulfonate; 9-(2-carboxyphenyl)-3-[(2-methylphenyl) amino]-6-[(2-methyl-4-sulfophenyl)-amino]xanthylium inner salt, monosodium salt; 1-hydroxy-4-[(4-methyl-2-sulfophenyl)amino]-9,10-anthraquinone sodium salt; bis{3-nitro-4-[(4-phenylamino)-3-sulfophenylamino] phenyl}sulfone; disodium 5-amino-4-hydroxy-6-[(4-nitrophenyl)azo]-3-(phenylazo)-2,7-naphthalenedisulfonate; 3-hydroxy-4-[(2-hydroxynaphth-1-yl)azo]-7-nitro-1-naphthalenesulfonic acid chromium complex (3:2); disodium 3-[(2,4-dimethyl-5-sulfophenyl) azo]-4-hydroxy-1-naphthalenesulfonate; tetrasodium 4-(acetylamino)-5-hydroxy-6-[(7-sulfo-4-[(4-sulfophenyl) azo]naphth-1-yl)azo]-1,7-naphthalenedisulfonate; sodium 3-hydroxy-4-(3-methyl-5-keto-1-phenyl-4,5-dihydro-1H-pyrazol-4-yl-azo)naphthalene-1-sulfonate, chromium complex; 3',3'',4,5,5',5'',6,7-octabromophenolsulfonphthalein; 1-((4-amino-3,5-dimethylphenyl)-(2,6-dichlorophenyl) methylene)-3,5-dimethyl-4-imino-2,5-cyclohexadiene combined with phosphoric acid (1:1); 2',4',5',7'-tetrabromo-4,5,6,7-tetrachloro-3',6'-dihydroxyspiro{isobenzof-uran-1-(3H), 9'[9H]xanthen}-3-one disodium salt; N,N-di(2-hydroxyethyl)-3-methyl-4-[(4-nitrophenyl)azo]aniline; disodium 2,4-dinitro-1-naphthol-7-sulfonate; sodium 4-[(2-hydroxynaphthalen-1-yl)azo]-benzenesulfonate; 2-((4-(ethyl-(2-hydroxyethyl)amino)-2-methylphenyl)azo)-5-nitro-1,3-thiazole; 2,4-di nitro-1-naphthol; 2-[(4-aminophenyl)azo]-1,3-dimethyl-1H-imidazol-3-ium chloride; 1-methyl-4-[(methylphenylhydrazono)methyl] pyridinium methosulfate; 2-{[4-(dimethylamino)phenyl] azo}-1,3-dimethylimidazolium chloride; 2-((4-((4-methoxyphenyl)amino)phenyl)azo)-1,3-dimethyl-1H-imidazol-3-ium chloride; and 1,3-dimethyl-2-((4-((phenylmethyl)amino)phenyl)azo)-1H-imidazol-3-ium chloride; and combinations thereof.

In some embodiments, the dye is provided as a composition of one or more dye molecules, optionally along with other components such as one or more additives, and dissolved in water. In some embodiments, the dye composition, can include one or more, for example, a plurality of dye molecules. In some embodiments, the dye composition comprises, consists essentially, or consists of a dye molecule, water, optionally a co-solvent such as a lower alcohol (s), and optionally one or more additives. For example, the additives may include one or more of a surfactant, a solubilizing agent, a preservative, or a combination thereof. In some embodiments, the dye composition comprises the one or more dye molecules in about 0.01 to about 100 mg/mL, or about 0.1 to about 100 mg/mL. In preferred embodiments, the dye composition comprises the one or more dye molecules in about 1 to about 50 mg/mL. In such embodiments, the dye weight ratio is the mass ratio of the dye composition to the alkali metal dihydrogen phosphate solids. In some embodiments, the composition comprises the dye in a weight ratio of about 0.01 to about 1 relative to the % wt. solids of the alkali metal dihydrogen phosphate. For example, in certain embodiments, the dye and the alkali metal dihydrogen phosphate are present in the composition in a weight ratio of about 0.01, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7. 2.8, 2.9, or 3. In preferred embodiments, the composition comprises the dye composition in a weight ratio of about 0.01 to about 0.4, or more preferably about 0.05 to about 0.2 relative to the % wt. of the alkali metal dihydrogen phosphate.

In some embodiments, the dye composition comprises, consists essentially, or consists of water, disodium 6-hydroxy-5-[(2-methoxy-5-methyl-4-sulfophenyl)azo] 2-naphthalene sulfonate, 2-(6-hydroxy-2,4,5,7-tetraiodo-3-oxoxanthen-9-yl)benzoic acid, optionally propylene glycol, and optionally paraben.

In some embodiments, the dye composition comprises, consists essentially, or consists of water, trisodium (4E)-5-oxo-1-(4-sulfonatophenyl)-4-[(4-sulfonatophenyl)hydrazono]-3-pyrazolecarboxylate, ethyl-[4-[[4-[ethyl-[(3-sulfophenyl) methyl] amino] phenyl]-(2-sulfophenyl) methylidene]-1-cyclohexa-2, 5-dienylidene]-[(3-sulfophenyl) methyl] azanium, optionally propylene glycol, and optionally propylparaben.

In certain embodiments, the composition comprises about 15% wt. sodium dihydrogen phosphate, about 1.5% wt. dye composition as provided herein, and water.

In some embodiments, the pH of the water soluble dye agent is between approximately 4.0 and 8.0, more preferably between approximately 6.0 and 8.0 and even more preferably between approximately 7.0 and 8.0. In one embodiment, the pH is approximately 4, 4.5, 5, 5.5, 6, 6.5, 7, 7.5, or 8.

Advantageously, the compositions disclosed herein enhance the ability of subsequent coatings to adhere to a burnished surface of a composite substrate. This enhanced adhesion is particularly important for composite substrates, made of, for example, fiber cement and having burnished surfaces, and for products that are exposed to environmental cycling. A composite product treated with a composition provided herein may advantageously reduce damage due to loss of adhesion of a top coat, for example, bubbling, cracking, or flaking. Such reduced damage may further exhibit a number of other advantages. Thus, in certain embodiments, the appearance of a coated composite product may be improved, for example, due to increased uniformity. In further embodiments, the sealing and waterproofing performance of a coated composite product may be improved. These advantages may be realized following the passage of climatic seasons or under a variety of weathering conditions. In particular, in certain embodiments, wet adhesion of a top coat may be improved.

Also provided herein are composite products having a coating layer of the composition, for example, tinted sealing agent. The compositions disclosed herein can be used as part of a coating system for composite products. The FIGURE illustrates a composite substrate 100, such as a fiber cement board, having a composition disclosed herein applied to an exterior surface 110. The fiber cement board can be a siding, a plank, a decking, a post, a roof tile, or the like. In the embodiment of the FIGURE, the composite substrate 100 has been coated with a tinted sealing agent, and a top coat.

Advantageously, the composition, when applied to a surface of a composite article, can provide a visual distinction between coated and uncoated areas. Compositions, such as tinted sealing agents provided herein, when applied to a composite substrate, create a difference in color based on the presence and weight of the sealing agent coat. Delta E (or "dE") values are metrics used to measure the difference between two color values. dE is generally a measurement of color intensity. It has been discovered that a dE difference of about 2 and 30, between a coated composite product and the corresponding uncoated substrate, creates a useful visible indication for the end user. A dE value between approximately 2 and 30 was found to be sufficient to permit an end user to determine that complete coverage of the specimen by the sealing agent was achieved, and that the coating had sufficient uniformity. Advantageously, the composition as provided herein can allow the user to estimate the coating weight. Such dE values were also found to result in a surface tint or color that did not impact on the appearance of a subsequent top coat. In some embodiments, the dE of a coated composite product is approximately 2, 3, 4, 5, 6, 7, 8, 9, 10, 11, 12, 13, 14, 15, 16, 17, 18, 19, 20, 21, 22, 23, 24, 25, 26, 27, 28, 29, or 30 relative to the corresponding uncoated composite product specimen.

Some embodiments disclose a coated composite product comprising a composite substrate having at least one coating layer applied to at least a portion of the composite substrate, wherein the at least one coating layer comprises a composition, the composition comprising, consisting essentially, or consisting of alkali metal dihydrogen phosphate dissolved in water forming an aqueous solution, such that the alkali metal dihydrogen phosphate is about 5 to 40% wt. of the composition; and a dye composition comprising, consisting essentially, or consisting of water, one or more dye molecules, and optionally one or more additives, wherein the dye composition is present in a dye weight ratio of about 0.01 to about 1 relative to the % wt. of the alkali metal dihydrogen phosphate, and more preferably between 0.02 and 1 relative to the % wt. of the alkali metal dihydrogen phosphate. In some embodiments, the at least one coating layer is a sealing agent, the sealing agent comprising water; an aqueous solution comprising dihydrogen phosphate and an alkali metal ion, such that the sealing agent comprises the dihydrogen phosphate and alkali metal ions in about 1 to about 40% wt. solids. In some embodiments, the sealing agent comprises a water soluble dye composition in a weight ratio of about 0.01 to about 1 relative to the % wt. of the dihydrogen phosphate and alkali metal ions.

In some embodiments, the at least one sealing agent layer comprises, consists essentially, or consists of water, sodium dihydrogen phosphate, and a dye composition, such that the solids content of sodium dihydrogen phosphate comprises approximately 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40% wt. solids, and the dye composition weight ratio is about 0.01, 0.05, 0.1, 0.2, 0.3, 0.4, 0.5, 0.6, 0.7, 0.8, 0.9, or 1 relative to the % wt. solids of sodium dihydrogen phosphate.

In some embodiments, the at least one coating layer of the sealing agent comprises a coating weight of about 2 to about 40 g/ft$^2$, about 3 to about 35 g/ft$^2$, about 4 to about 30 g/ft$^2$, about 5 to about 25 g/ft$^2$, and more preferably about 10 to about 25 g/ft$^2$. It is to be understood that the coating weight is not limited to these values and that it can be altered as required by a person skilled in the art to obtain the desired properties of the coated composite product. It is to be understood that the coating weight is dependent on the condition of the composite product or composite material to which the coating layer of the sealing agent is being applied.

If the composite product is wet, a person skilled in the art would understand that a lighter coating weight coating layer, for example, about 2 g/ft², could be applied to the wet composite product, while, in contrast, a heavier coating weight coating layer, for example, about 10 g/ft², could be applied to a dry composite product.

In another embodiment, the at least one coating layer is at least partially cured.

In some embodiments, the composite product comprises a building material comprising cementitious materials, gypsum, or other suitable inorganic building materials such as those containing cellulose, glass, steel or polymeric fibers. In a further embodiment the composite product comprises a fiber cement composite product. In a further embodiment, the composite substrate comprises at least one burnished surface. In an embodiment, a composite product treated with a composition suitable for use as a sealing agent further comprises at least one top coat coating layer applied to the coated composite product. In a further embodiment the top coat coating layer is at least partially cured.

In a further embodiment, a method of manufacturing a coated composite product is disclosed comprising the steps of: providing a composite substrate; coating at least a portion of the composite substrate with at least one coating layer, wherein the at least one coating layer comprises a composition provided herein, the composition comprising, consisting essentially of, or consisting of an aqueous solution comprising dihydrogen phosphate and an alkali metal ion which can serve as buffer, such that the buffer comprises between approximately 5 to 40% wt. solids of the composition; and a water soluble dye composition, wherein the dye composition weight ratio is between 0.01 and 1 relative to the % wt. solids of the aqueous solution; and at least partially curing the coating layer.

Coating the composite substrate can comprise any typical application method known to those of skill in the art. For example, coating the composite substrate can comprise such steps as flood coating, spraying, rolling, wiping, or a combination thereof. In an embodiment, the method further comprises applying at least one top coat coating layer. In a further embodiment the top coat coating layer is at least partially cured.

In some embodiments, a method of manufacturing a composition suitable for use as a tinted sealing agent is provided, comprising: providing a selected amount of an aqueous solution comprising dihydrogen phosphate and an alkali metal ion; providing a selected amount of a water based dye composition; and combining the aqueous solution and the water based dye composition with water; wherein the amount of aqueous solution is selected to provide a pH of about 3 to about 5; and wherein the amount of water based dye composition is selected to provide a dye weight ratio of 0.01 to about 10 relative to the % wt. solids of the aqueous solution and to provide a dE of about 2 to about 30 upon application of the composition to a composite substrate.

EXAMPLES

Formulations for sealing agents as described herein, and in accordance with certain embodiments, are set out in Table 1 below. One formulation comprises a solution of sodium dihydrogen phosphate ($NaH_2PO_4$) in water together with a water based dye composition. It is of course understood that sodium is an alkali metal ion selected from Group 1 of the periodic table and that other suitable alkali metal ions, for example, potassium and so forth, may also be used.

In Table 1 below, sample formulations with corresponding pH values are provided. In samples 1 to 6 below the water soluble dye composition is a liquid dye comprising water, propylene glycol, disodium 6-hydroxy-5-[(2-methoxy-5-methl-4-sulfophenyl) azo] 2-naphthalene sulfonate, 2-(6-hydroxy-2,4,5,7-tetraiodo-3-oxo-xanthen-9-yl)benzoic acid and propylparaben. In samples 7 and 8, the water soluble dye composition is a liquid dye comprising water, propylene glycol, trisodium (4E)-5-oxo-1-(4-sulfonatophenyl)-4-[(4-sulfonatophenyl)hydrazono]-3-pyrazolecarboxylate, ethyl-[4-[[4-[ethyl-[(3-sulfophenyl) methyl] amino] phenyl]-(2-sulfophenyl) methylidene]-1-cyclohexa-2, 5-dienylidene]-[(3-sulfophenyl) methyl] azanium, and propylparaben.

TABLE 1

Sample Formulations and pH Values

| Sample number | % Solids of $NaH_2PO_4$ in Solution | % Water in Solution | Weight Ratio of Dye Composition relative to the % wt. of solids of $NaH_2PO_4$ in Solution | pH of Solution ±0.2 |
|---|---|---|---|---|
| 1 | 5 | 95 | 0.1 | 4.59 |
| 2 | 10 | 90 | 0.1 | 4.33 |
| 3a | 15 | 85 | 0.02 | 4.27 |
| 3b | 15 | 85 | 0.05 | 4.23 |
| 3c | 15 | 85 | 0.1 | 4.23 |
| 3d | 15 | 85 | 0.2 | 4.22 |
| 3e | 15 | 85 | 0.33 | 4.14 |
| 3f | 15 | 85 | 0.5 | 4.25 |
| 3g | 15 | 85 | 1 | 4.28 |
| 4 | 20 | 80 | 0.1 | 4.17 |
| 5a | 30 | 70 | 0.1 | 4.0 |
| 5b | 30 | 70 | 0.2 | 3.98 |
| 5c | 30 | 70 | 0.33 | 4.04 |
| 6 | 40 | 60 | 0.1 | 3.94 |
| 7 | 15 | 85 | 0.1 | — |
| 8 | 30 | 70 | 0.1 | — |

General Testing Information:

Each of the sample formulations of the sealing agent outlined in Table 1 above was applied to the surface of a composite product specimen. In each case, the composite product specimen comprised a fiber cement substrate. The coating agent was then partially cured.

In each example provided in Table 2 below, the indicated sample formulation from Table 1 was applied to the surface of a composite product specimen as a single coat, wherein the coat weight is identified as 10 g/ft²; as a two coat sample, wherein the coat weight is identified as 20 g/ft²; or a three coat sample, wherein the coat weight is identified as 30 g/ft².

Color Difference Testing: The dE value for the raw uncoated specimen was measured and the average dE value, as a measurement of the difference in color between various uncoated specimens, was 0.76. Following coating of the specimens, the dE of each coated composite product specimen was measured. It was discovered that a dE value between approximately 2 and 30, between a coated composite product specimen and the corresponding uncoated specimen, created a visible difference for the end user. A dE value between approximately 2 and 30 was sufficient to permit an end user to determine that the sealing agent was applied uniformly to the specimen. Such dE values also resulted in a 'tint' or 'color' due to the sealing agent that did not impact on the appearance of a subsequent top coat. Data for the dE of various tinted sealing agents is provided in Table 2. In Table 2, a larger dE indicates a greater visual difference.

TABLE 2

Coat Weight and dE Measurements

| Sample number | Coat Weight g/ft$^2$ | dE |
|---|---|---|
| 1 | 20 | 8.75 |
| 2 | 20 | 10.41 |
| 3a | 10 | 5.47 |
| 3a | 20 | 7.82 |
| 3b | 20 | 10.19 |
| 3b | 30 | 12.93 |
| 3c | 20 | 14.88 |
| 3c | 30 | 13.81 |
| 3d | 20 | 19.05 |
| 3e | 20 | 20.86 |
| 3f | 20 | 23.01 |
| 3g | 10 | 22.69 |
| 3g | 20 | 27.69 |
| 4 | 10 | 11.95 |
| 4 | 20 | 17.14 |
| 4 | 30 | 14.43 |
| 5a | 10 | 15.90 |
| 5a | 20 | 20.69 |
| 5a | 30 | 15.64 |
| 5b | 20 | 26.92 |
| 5c | 20 | 28.01 |
| 6 | 20 | 21.90 |
| 7 | 10 | 12.66 |
| 7 | 20 | 17.33 |
| 8 | 10 | 20.54 |
| 8 | 20 | 24.09 |

Adhesion Testing:

Adhesion testing was conducted on coated composite specimens for each of the sample formulations of Table 1, as outlined below. For each sample formulation, tests were conducted to determine adhesion of a top coat on the treated composite product specimens of Table 2. Testing included dry adhesion, wet adhesion, and wet adhesion after cycling through an environmental chamber. In each instance, a burnished composite surface of the composite product specimen was coated with the identified sealing agent formulation and, subsequently, a top coat. The applied top coat was a commonly used and commercially available exterior satin house paint.

The adhesion tests were conducted in accordance with ASTMD3359. Specifically, adhesion values were measured as follows: 3M™ #250 Scotch® masking tape approximately 1" wide was applied to the surface of a specimen and manually pressed down onto the textured surface. The specimen and tape were rolled with a 10 pound roller. The tape was then quickly removed from the specimen. In each case, at least three examples of each coating agent on each specimen were tested.

Dry adhesion tape test: For the dry adhesion tape test, each sample of the tinted sealing agent as presented in Table 1 was applied to the specimens, such that each of the composite product specimens had the respective coat weights as outlined in Table 3 (presented below). A top coat was then applied to each of the coated specimens such that the coat weight of the top coat was 12 g/ft$^2$. The coated specimens were allowed to cure before the adhesion test was performed.

Wet adhesion tape test: For the wet adhesion tape test, each specimen was coated as outlined above for the dry adhesion tape test. Each coated specimen was subsequently soaked for approximately 24 hours in water. Water was then removed from the surface of each specimen after soaking, and before the adhesion test was performed.

Wet adhesion tape test after cycling through an environmental chamber: Each specimen was coated as outlined above for the dry adhesion tape test. Subsequently, each sample was placed in an environmental chamber and the appropriate number of cycles were completed in the environmental chamber. The same process outlined above for the wet adhesion test was carried out on each of the coated samples once the appropriate number of cycles were completed in the environmental chamber.

Preparation of a Control Sample:

Samples were prepared in accordance with certain embodiments as set out above, in order to assess the effect on top coat adhesion of the tinted sealing agent as described herein. A number of control samples were prepared in which a top coat was applied directly to the burnished surface of each raw composite product specimen (without the presence of a sealing agent). The top coat applied to the raw composite product specimens was the same as that applied to the coated composite product samples as outlined above. The coat weight of the top coat of the control samples was also 12 g/ft$^2$. The control samples were also allowed to cure before the adhesion tests outlined above were performed. In each case at least three control samples were tested.

The adhesion test results for the control samples and the coated composite product samples were averaged and are presented below in Table 3.

TABLE 3

Adhesion Test Results

| Sample number | Coat Weight g/ft$^2$ | AVERAGE ADHESION TEST RESULTS | | |
|---|---|---|---|---|
| | | Dry | Wet (24 Hrs) | Wet (Env Cycling) |
| CONTROL | — | 90 | 90 | 85.2 |
| 1 | 20 | 33.3 | 65 | 70 |
| 2 | 20 | 31.7 | 70 | 47.5 |
| 3a | 10 | 55 | 85 | 71.7 |
| 3a | 20 | 18.3 | 58.3 | 59.2 |
| 3b | 20 | 14 | 35 | 50.2 |
| 3b | 30 | 39.7 | 30 | 55.3 |
| 3c | 20 | 1.6 | 25 | 46.3 |
| 3c | 30 | 33.6 | 78.3 | 45.3 |
| 3d | 20 | 1.3 | 56.7 | 49.7 |
| 3e | 20 | 12.3 | 41.7 | 34 |
| 3f | 20 | 1.7 | 36.7 | 53.3 |
| 3g | 10 | 70 | 86.6 | 72.5 |
| 3g | 20 | 6.7 | 76.7 | 63.8 |
| 4 | 10 | 8.3 | 45 | 44.2 |
| 4 | 20 | 0.7 | 31.7 | 17 |
| 4 | 30 | 45.7 | 68.3 | 62.7 |
| 5a | 10 | 0 | 13 | 8.3 |
| 5a | 20 | 0.3 | 11.3 | 7.8 |
| 5a | 30 | 47.3 | 60 | 59.2 |
| 5b | 20 | 4.3 | 23.3 | 22.8 |
| 5c | 20 | 32.3 | 32.7 | 45.5 |
| 6 | 20 | 0 | 1.6 | 3.3 |

For a sample formulation to show improved paint adhesion of the top coat to burnished surfaces of the composite substrate, the average adhesion test result for each sample formulation must be lower than the average adhesion test result of the corresponding control sample. In all instances as outlined in Table 3 above, the dry, wet and wet after environmental cycling adhesion test results indicated that adhesion of the top coat to the composite substrate improved with the presence of the sealing agent.

It will of course be understood that the invention disclosed herein is not limited to the specific details described herein, which are given by way of example only, and that various modifications and alterations are possible within the scope of the invention.

For the purpose of this specification, the term 'comprise' shall have inclusive meaning and be taken to mean an inclusion of not only the listed components it directly references, but also other non-specified components. Accordingly, the term 'comprise' is to be attributable with as broad an interpretation as possible, and this rationale is also used when the terms 'comprised' and/or 'comprising' are used.

What is claimed is:

1. A coating composition suitable for use as a sealing agent for a cementitious substrate, comprising:
    water;
    5-40% wt. of an alkali metal dihydrogen phosphate, wherein the alkali metal dihydrogen phosphate is dissolved in the water to form an acidic aqueous solution comprising dihydrogen phosphate and alkali metal ions;
    a water-based dye composition, said water-based dye composition is dispersed in the acidic aqueous solution, wherein the % wt. ratio of the water-based dye composition to the alkali metal dihydrogen phosphate is between 0.01 and 0.5; and
    wherein the pH value of the coating composition is maintained at a level lower than 7 such that the composition provides sufficient hydrogen ions to neutralize one or more functional groups on a surface of the cementitious substrate.

2. The composition of claim 1, wherein the alkali metal dihydrogen phosphate is sodium dihydrogen phosphate.

3. The composition of claim 1, wherein the pH value of the coating composition is between 3.0 and 5.0.

4. The composition of claim 1, wherein the dye composition comprises water and one or more water soluble dye molecules that are stable in an acidic solution.

5. The composition of claim 4, wherein the one or more dye molecules comprises disodium 6-hydroxy-5-[(2-methoxy-5-methyl-4-sulfophenyl)azo] 2-naphthalene sulfonate, and 2-(6-hydroxy-2,4,5,7-tetraiodo-3-oxo-xanthen-9-yl)benzoic acid.

6. The composition of claim 1, wherein the dye composition comprises water, disodium 6-hydroxy-5-[(2-methoxy-5-methyl-4-sulfophenyl)azo] 2-naphthalene sulfonate, 2-(6-hydroxy-2,4,5,7-tetraiodo-3-oxo-xanthen-9-yl)benzoic acid, propylene glycol, and paraben.

7. The composition of claim 4, wherein the one or more dye molecules are about 1 to about 50 mg/mL of the dye composition.

* * * * *